Patented Sept. 1, 1931

1,821,667

UNITED STATES PATENT OFFICE

EBENEZER EMMET REID, OF BALTIMORE, MARYLAND, ASSIGNOR TO E. I. DU PONT DE NEMOURS & COMPANY, OF WILMINGTON, DELAWARE, A CORPORATION OF DELAWARE

PROCESS OF CONDENSING ALCOHOLS

No Drawing.  Application filed November 13, 1928. Serial No. 319,180.

This invention relates to catalytic reactions, and more particularly to catalytic reactions in which alcohols of lower molecular weight are directly condensed to form alcohols of higher molecular weight.

It has long been known that alcohols may be condensed indirectly by passing through the alcoholate stage, but up to the time of this invention no direct method for their condensation had been evolved. By the prior art method it was necessary first to prepare an alcoholate. This was disadvantageous because these substances are difficult to prepare and handle. Furthermore, the organic radical of the alcoholate was oxidized with the formation of hydrogen and a salt of an acid corresponding to that alcohol, and this consumed the original alcoholate and limited the duration of the condensation reaction. Also, the condensed alcohol was formed as a higher alcoholate which had to be hydrolyzed to obtain the desired alcohol.

This invention has as an object the development of a catalytic process for the direct condensation of alcohols of lower molecular weight to form alcohols of higher molecular weight without the preparation of any intermediate compounds. Another object of this invention is to develop a continuous catalytic process for the direct condensation of alcohols. A further object is to develop a catalytic process for the condensation of alcohols in which no solid reaction products are formed. Other objects will appear hereinafter.

These objects are accomplished by heating alcohols under pressure in the presence of a catalyst comprising an alkali or alkali earth salt of a fatty acid.

The original alcohols are primary alcohols or mixtures of alcohols containing at least one primary alcohol, the particular alcohols selected depending upon the alcohols which it is desired to obtain.

The catalyst may be prepared by neutralizing the hydroxides or carbonates of the metals with the desired fatty acid. For example, in the preparation of potassium butyrate, potassium hydroxide may be neutralized with technical butyric acid and the resulting solution evaporated to dryness. The solid potassium butyrate left after evaporation may be fused and is then ready for use. Any other method of preparing the salt will serve equally well and it is not intended to limit the preparative procedure to the example just given. Many of the salts of fatty acids are highly hygroscopic and it may be desirable to free them from water by fusing or by heating in an evacuated vessel, although this is not essential. The following salts are examples of suitable catalysts:—potassium butyrate, potassium propionate, sodium propionate, rubidium butyrate, rubidium caprylate, potassium carprylate, potassium caproate, sodium crotonate, lithium valerate, and calcium butyrate, and any of them may be used in a given condensation reaction. For example, potassium butyrate may be used to catalyze the condensation of propanol to hexanol, or potassium caprylate may be used to catalyze the condensation of butanol to octanol. However, in the latter case, the potassium caprylate is at least partially substituted during the reaction by butyrate, probably as the result of a secondary reaction. In a continuous process using potassium caprylate as the catalyst, for example, this salt would be eventually transformed to butyrate. In general the catalyst is the alkali salt of the fatty acid which is formed by the oxidation of the alcohol used.

The following examples illustrate several embodiments of my invention:

*Example 1.*—1,000 grams of normal butanol and 500 grams of dry potassium butyrate were placed in a steel tube built to withstand pressures of 2,000 to 3,000 pounds per square inch and having a volume of 2¾ liters. The tube was sealed and then heated for four hours at 350° C. At the end of this time, the tube was cooled, opened, and the contents washed out with one liter of cold water. An oily layer of material which rose to the surface of the water was separated, dried with potassium carbonate and fractionated. Approximately 275 grams of octanol, in the form of 2-ethyl hexanol-1, was recovered, representing about 31.7% of the original butanol. The water layer from which the oily material was separated was evaporated to recover the potassium butyrate.

*Example 2.*—The procedure of Example 1 was repeated, but at 345° C. for 6 hours using 500 grams of butanol and 250 grams of potassium butyrate. The yield of octanol was decreased to about 113 grams or 25.5% based on the original butanol, as a result of the lower pressure.

*Example 3.*—175 grams of normal propanol and 40 grams of potassium propionate were heated in a steel tube of 1,000 cc. capacity for 7 hours at 360° C. The tube was cooled and the contents removed, separated, and fractionated, as in Example 1. Approximately 15 grams of hexanol, in the form of 2-methyl pentanol-1, were recovered representing 10% of the original normal propanol. The catalyst was recovered by evaporation as in Example 1.

*Example 4.*—120 grams of butanol and 60 grams of potassium butyrate were heated in a steel tube of 400 cc. capacity for 15 hours at 275° C. The yield of octanol, in the form of 2-ethyl hexanol-1, was approximately 20%.

*Example 5.*—800 grams of butanol and 40 grams of potassium butyrate were heated in a steel tube of 2¾ liters capacity for 21 hours at 340° C. The yield of octanol, in the form of 2-ethyl hexanol-1, was 19.2%.

*Example 6.*—The procedure of Example 5 was repeated using 40 grams of rubidium butyrate in place of the potassium butyrate. The yield of octanol was 19%.

*Example 7.*—The procedure of Example 5 was repeated using 40 grams of potassium caprylate in place of the potassium butyrate. The yield of octanol was 16.5%.

*Example 8.*—The procedure of Example 5 was repeated using 40 grams of calcium butyrate in place of the potassium butyrate. The yield of condensation products was 8%, 6.4% boiling at about 170° C. in contrast to octanol which boils at from 183–185° C. It is estimated that the condensation products obtained were approximately 50% octanol, but a quantitative analysis was not made.

*Example 9.*—100 grams of potassium butyrate were placed in a steel tube provided with top and bottom connections and a thermocouple well. The tube was inserted vertically in a furnace and heat was applied. Butanol was passed through a preheater at 350° C. at the rate of 200 cc. per hour and at atmospheric pressure, and thence to the bottom inlet of the reaction tube. The vapors were taken off from the top of the reaction tube and led to a condenser and then to a separator where any gases formed were removed. The products were obtained by fractional distillation and the yield of higher alcohols was about 2% of the butanol passed through the reaction tube. No gas was formed under these conditions.

*Example 10.*—The procedure of Example 9 was repeated, but the temperature was increased to 450° C. The conversion to higher boiling alcohols was increased to 2.5%. 500 cc. of gas per gram of potassium butyrate per hour was formed.

*Example 11.*—The procedure of Example 9 was repeated, but the pressure was increased to 1000 pounds per square inch. The conversion of butanol to octanol, in the form of 2-ethyl hexanol-1, was about 11%, with the formation of about 450 cc. of gas per hour per gram of potassium butyrate.

*Example 12.*—The procedure of Example 9 was repeated, but the condensation was carried out at 340° C. and at a pressure of 3000 pounds per square inch. The conversion to octanol was about 13% of the butanol used, while the gas formation was lowered to about 150 cc. per gram of potassium butyrate per hour.

As evidenced by the above examples, my invention can be carried out as an intermittent or a continuous process.

Although I have limited the above examples to the production of hexanol and octanol, it will be obvious that other alcohols of higher molecular weight may be formed by the process of my invention, although I have found that methanol and ethanol are not condensed to ethanol and butanol, respectively, in commercially advantageous yields. For example, I may produce decanol from pentanol, and so on. Furthermore, I may condense a single alcohol to form an alcohol of double the number of carbon atoms, or I may condense two or more alcohols to form another alcohol of different molecular weight. Thus, ethanol and propanol may be condensed together to form pentanol, and propanol and butanol may be condensed to form heptanol.

I have found that the condensation of alcohols is progressive. For example, starting with a single alcohol, one having double the number of carbon atoms is formed and a part of the higher alcohol thus formed is then condensed with part of the original alcohol to form another alcohol of three times the number of carbon atoms in the original alcohol, and so on progressively. Thus, propanol may be condensed to form hexanol, which may be itself condensed with more propanol to form nonanol, and so on. It will thus be seen that in a single condensation reaction I may produce a number of different higher alcohols.

As indicated above, I have found that when octanol is formed it is obtained in the form of 2-ethyl hexanol-1, and that when hexanol is formed it is obtained in the form of 2-methyl pentanol-1, and I have found that this is a general rule for the condensation of the higher alcohols because the hydrogen on the beta carbon atom is the one which is most easily replaced.

As a by-product of the above reactions a small amount of the hydrocarbon corresponding to the higher alcohol is obtained. For example, in the production of octanol I obtain from about 2 to 20% of octylene, based on the original butanol, and similarly I obtain hexylene in the production of hexanol.

The conditions of temperature, pressure, and velocity will vary with the nature of the original alcohol, but in general it may be said that condensation proceeds further the higher the temperature and pressure and the lower the velocity, and that alcohols of high molecular weight are more readily condensed than those of low molecular weight, but the heating should be conducted at temperatures below the decomposition temperatures of the original alcohols or those formed in the condensation. I have found that a suitable range for the production of alcohols by the process of my invention is from 250° C. to 475° C. while the preferred range is from 275° to 400° C.

Although condensation takes place at atmospheric pressure, the use of pressures of at least 1000 pounds per square inch is advantageous. Satisfactory yields of higher alcohols can be obtained at somewhat lower pressures. The effect of pressures on the yields obtainable may be illustrated by the results obtained in runs made with the continuous process. In the condensation of butanol to octanol, when 2 cc. of butanol per gram of potassium butyrate per hour were passed through the reaction chamber at 400° C. and at pressures of one atmosphere, 1000 pounds per square inch and 3000 pounds per square inch, the percentage conversions to octanol were 1.3, 8.5, and 13.6, respectively.

I have also found that agitation of the reacting substances is very desirable in either a continuous or an intermittent process. That such agitation is desirable is shown by the fact that when butanol is heated at 340° C. for 21 hours with 5% of its weight of potassium butyrate without agitation, only 15.1% of the butanol is converted to octanol, as compared to a conversion of 19.2% when there is agitation.

Of the examples of the invention outlined above, those illustrating the continous method are the most efficient, since the catalyst may be used indefinitely and it is unnecessary to stop the process to remove the reaction products.

By using the prior art method in which the alcohol passed through the alcoholate stage, the process was necessarily intermittent due to the using up of the catalytic mass by the stoichiometric formation of acids and hydrogen, necessitating the recharging of the apparatus, but by my invention the catalyst is practically unaffected and may be used indefinitely in either a continuous or intermittent process.

The condensation of alcohols of lower molecular weight to higher alcohols was previously very difficult and the losses of alcohol to other reaction products, notably acids, were large. My invention permits the condensation of alcohols without the formation of solid reaction products or acids. Furthermore, the condensation takes place with less formation of hydrogen than heretofore. It will thus be seen that I have provided a process in which no solid products are formed and by making the process continuous, as illustrated in Examples 9 to 12, it is possible to avoid the necessity of separating the catalytic material from the reaction products. Moreover, the use of metals in the elementary form, which was necessary for the preparation of the alcoholates used in the previously known process, which in themselves are difficult to handle, is avoided and the more accessible hydroxides or carbonates of the metals are used in preparing the catalyst.

As many apparently widely different embodiments of this invention may be made without departing from the spirit and scope thereof, it is to be understood that I do not limit myself to the specific embodiments thereof except as defined in the appended claims.

I claim:

1. A catalytic process for the direct condensation of alcohols to form alcohols of higher molecular weight, which comprises heating alcohols having more than two carbon atoms in the presence of an alkali forming metal salt of a fatty acid.

2. The process of claim 1, in which the salt used is a salt of the fatty acid which is formed by the oxidation of the alcohol used.

3. The process of claim 1, in which the catalyst is an alkali metal salt of a fatty acid.

4. The process of claim 1, in which the mixture is agitated during the reaction.

5. The process of claim 1, in which the salt is present in an amount equal to at least 5% by weight based on the quantity of alcohol used.

6. The process of claim 1, in which the salt is present in an amount greater than 20% by weight based on the quantity of alcohol used.

7. The process of claim 1, in which the reaction is carried out at a pressure of at least 1,000 pounds per square inch and at a temperature of at least 275° C.

8. The process of claim 1, in which the catalyst is present in an amount equal to at least 50% by weight based on the quantity of alcohol used, and in which the reaction is carried out at a pressure of at least 1,000 pounds per square inch and at a temperature of at least 275° C., and the reaction is continued until the yield is at least 10% on the basis of the weight of the original alcohol.

9. A catalytic process for the direct condensation of alcohols to form alcohols of higher molecular weight, which comprises heating a mixture of alcohols, at least one of which contains more than 2 carbon atoms, in the presence of an alkali forming metal salt of a fatty acid.

10. A catalytic process for the direct condensation of butanol to octanol, which comprises heating butanol under pressure in the presence of an alkali metal salt of a fatty acid.

11. The process of claim 10, in which the catalyst is potassium butyrate.

12. A catalytic process for the direct condensation of butanol to octanol in yields of at least 10%, which comprises heating butanol under pressure in the presence of an alkali metal salt of a fatty acid.

13. The process of claim 10, in which the proportion of the catalyst with respect to the original alcohol is at least 5% by weight.

14. A catalytic process for the direct condensation of butanol to octanol, which comprises heating butanol with at least 5% of its weight of potassium butyrate under pressure at a temperature of at least 275° C. until a yield of at least 10% of octanol is obtained.

15. A continuous catalytic process for the direct condensation of alcohols to form alcohols of higher molecular weight, which comprises passing alcohols having more than two carbon atoms through a heated reaction chamber in the presence of an alkali forming metal salt of a fatty acid.

16. A continuous catalytic process for the direct condensation of butanol to octanol, which comprises heating butanol under pressure in the presence of an alkali metal salt of a fatty acid.

17. The process of claim 16, in which the catalyst is potassium butyrate.

18. A continuous catalytic process for the direct condensation of alcohols to form alcohols of higher molecular weight, which comprises passing a preheated alcohol containing more than 2 carbon atoms over an alkali forming metal salt of a fatty acid at a rate of approximately 2 cc. of alcohol per gram of catalyst per hour, and at a pressure of at least 1,000 pounds per square inch and a temperature greater than 300° C.

19. The process of claim 18, in which the mixture is agitated during the reaction.

20. The process of claim 18, in which the original alcohol is butanol and the catalyst is an alkali metal salt of butyric acid.

21. The process of claim 18, in which the original alcohol is butanol and the catalyst is an alkali metal salt of butyric acid, and in which the mixture is agitated during the reaction.

22. A catalytic process for the direct condensation of alcohols to form a mixture of alcohols of higher molecular weight, including the alcohol of double the number of carbon atoms of the original alcohol, which comprises heating alcohols having more than two carbon atoms in the presence of an alkali forming metal salt of a fatty acid and stopping the heating when the alcohol of double the number of carbon atoms of the original alcohol predominates.

23. A catalytic process for the direct condensation of alcohols to form a mixture of alcohols of higher molecular weight, including the alcohol of double the number of carbon atoms of the original alcohol, which comprises heating alcohols having more than two carbon atoms in the presence of an alkali forming metal salt of a fatty acid and stopping the heating when the alcohol of double the number of carbon atoms of the original alcohol predominates, and when the yield of the predominating alcohol is at least 10% based on the original alcohol.

24. A catalytic process for the direct condensation of alcohols to form a mixture of alcohols of higher molecular weight, including the alcohol of double the number of carbon atoms of the original alcohol, which comprises heating alcohols having more than two carbon atoms in the presence of an alkali forming metal salt of a fatty acid and stopping the heating when the alcohol of double the number of carbon atoms of the original alcohol predominates, and when the yield of the predominating alcohol is at least 20% based on the original alcohol.

In testimony whereof, I affix my signature.

EBENEZER EMMET REID.